US009658379B2

(12) United States Patent
Spangler

(10) Patent No.: US 9,658,379 B2
(45) Date of Patent: May 23, 2017

(54) FIBER OPTIC DISPLAY APPARATUS AND METHODS OF OSILLATING ILLUMINATED OPTICAL FIBERS

(71) Applicant: Thomas Mark Spangler, Charlotte, NC (US)

(72) Inventor: Thomas Mark Spangler, Charlotte, NC (US)

( * ) Notice: Subject to any disclaimer, the term of this patent is extended or adjusted under 35 U.S.C. 154(b) by 392 days.

(21) Appl. No.: 14/134,137

(22) Filed: Dec. 19, 2013

(65) Prior Publication Data

US 2014/0104869 A1 Apr. 17, 2014

Related U.S. Application Data

(63) Continuation-in-part of application No. 13/327,344, filed on Dec. 15, 2011, now abandoned.

(60) Provisional application No. 61/423,572, filed on Dec. 15, 2010.

(51) Int. Cl.
*F21V 8/00* (2006.01)
*G09F 13/18* (2006.01)

(52) U.S. Cl.
CPC ........... *G02B 6/0005* (2013.01); *G09F 13/18* (2013.01)

(58) Field of Classification Search
CPC .............. F21K 9/13; G02B 2027/0178; G02B 27/0172; G02B 6/3802; G02B 6/3806; G02B 6/3843; G02B 6/3846; G02B 2027/0118; G02B 2027/0138; G02B 27/0075; G02B 27/0093; G02B 27/01; G02B 27/0101; G02B 27/017; G02B 6/3826; G02B 6/3833; G02B 6/385; G02B 6/3898; G02B 6/0005; A63F 2300/1043; A63F 2300/105; F21L 4/08; G09F 13/18
See application file for complete search history.

(56) References Cited

U.S. PATENT DOCUMENTS

| 2,784,388 A | 3/1957 | King et al. |
| 3,431,410 A | 3/1969 | Dolan et al. |
| 3,624,385 A | 11/1971 | Wall |
| 3,803,398 A | 4/1974 | Walker |
| 4,034,215 A | 7/1977 | Hashimoto |

(Continued)

FOREIGN PATENT DOCUMENTS

| WO | 92/00535 | 1/1992 |
| WO | 97/39277 | 10/1997 |

(Continued)

*Primary Examiner* — Stephen F Husar
(74) *Attorney, Agent, or Firm* — Ashley Law Firm P.C.; Stephen S. Ashley, Jr.

(57) ABSTRACT

A fiber optic display device reciprocates fiber optics to create decorative optical fiber light displays. The device can include one or more optical fibers contained at one end by a holding member and left suspended freely at the other end. The holding member and optical fibers are functionally attached about a pivot point axis that is across the longitudinal axis of the fibers and the holding member, to a housing. A light source can be affixed to either the holding member or the housing, opposite the freely suspended optical fiber ends, and is oriented to expose and illuminate the optical fibers. A drive means causes the holding member and optical fibers to reciprocate back and forth about the pivot point axis of the holding member.

20 Claims, 14 Drawing Sheets

(56) References Cited

U.S. PATENT DOCUMENTS

| | | | |
|---|---|---|---|
| 4,097,917 A * | 6/1978 | McCaslin | G02B 6/0005 |
| | | | 362/234 |
| 4,206,495 A * | 6/1980 | McCaslin | G02B 6/4298 |
| | | | 362/234 |
| 4,257,062 A | 3/1981 | Meredith | |
| 4,297,000 A | 10/1981 | Fries | |
| 4,298,868 A | 11/1981 | Spurgeon | |
| 4,328,534 A | 5/1982 | Abe | |
| 4,713,658 A | 12/1987 | Swinton | |
| 4,891,032 A | 1/1990 | Davis | |
| 4,924,358 A | 5/1990 | Von Heck | |
| 5,041,947 A | 8/1991 | Yuen et al. | |
| 5,422,796 A | 6/1995 | Peebles et al. | |
| 6,416,800 B1 * | 7/2002 | Weber | A23G 3/50 |
| | | | 362/109 |
| 6,428,432 B1 * | 8/2002 | Kachel | A63B 43/06 |
| | | | 473/570 |
| 6,880,961 B2 | 4/2005 | Lin | |
| 6,994,605 B2 | 2/2006 | Baxter et al. | |
| 7,159,994 B2 * | 1/2007 | Schnuckle | B44C 5/06 |
| | | | 362/161 |
| 7,261,455 B2 | 8/2007 | Schnuckle et al. | |
| 7,489,845 B2 | 2/2009 | Ip | |
| 2003/0133312 A1 | 7/2003 | Hsu | |
| 2008/0260336 A1 | 10/2008 | Hwang et al. | |
| 2008/0278929 A1 * | 11/2008 | Lorati | D04D 7/04 |
| | | | 362/109 |
| 2009/0154151 A1 | 6/2009 | Levine | |

FOREIGN PATENT DOCUMENTS

| | | |
|---|---|---|
| WO | 97/40520 | 10/1997 |
| WO | 2005/084477 | 9/2005 |

* cited by examiner

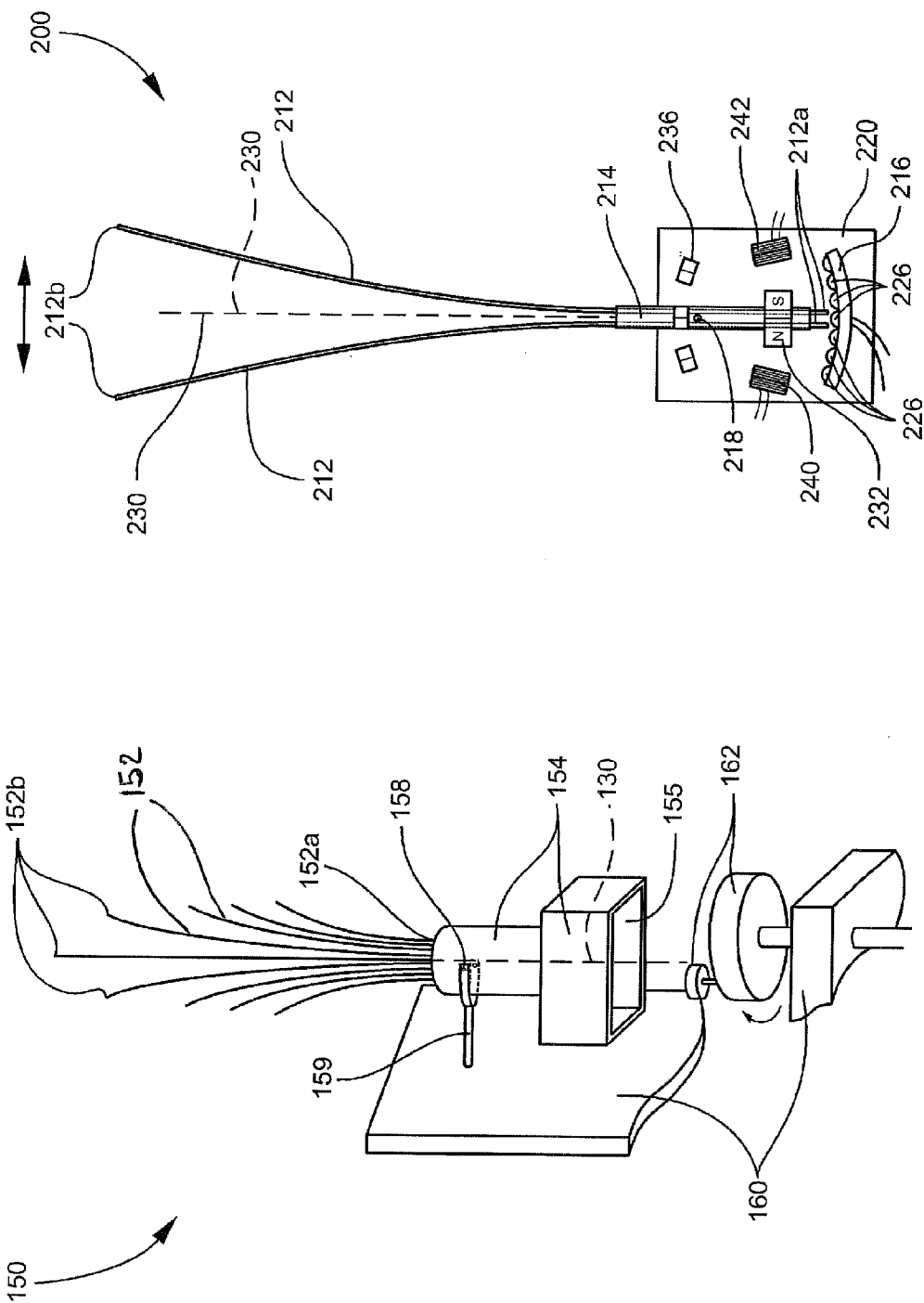

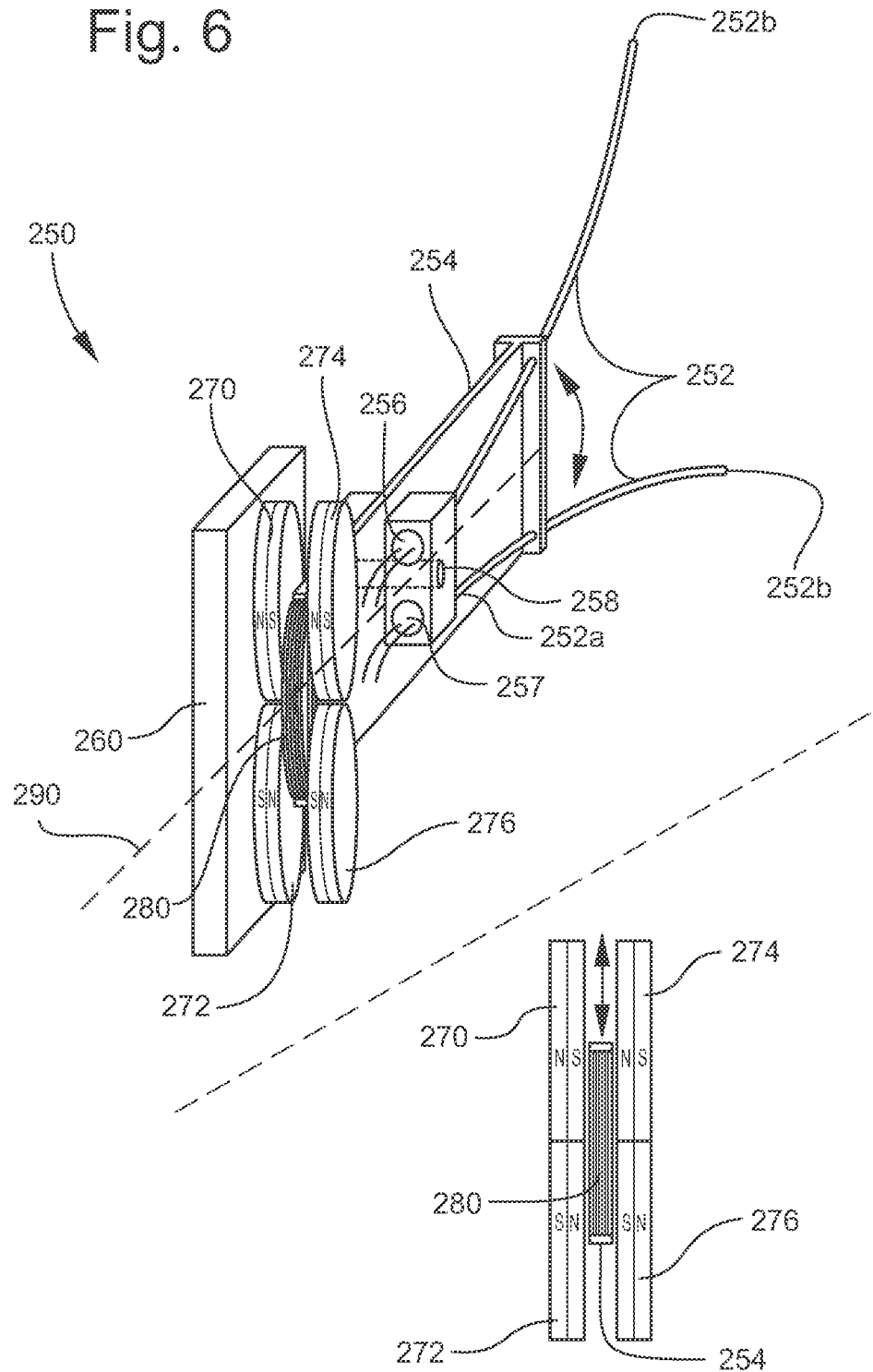

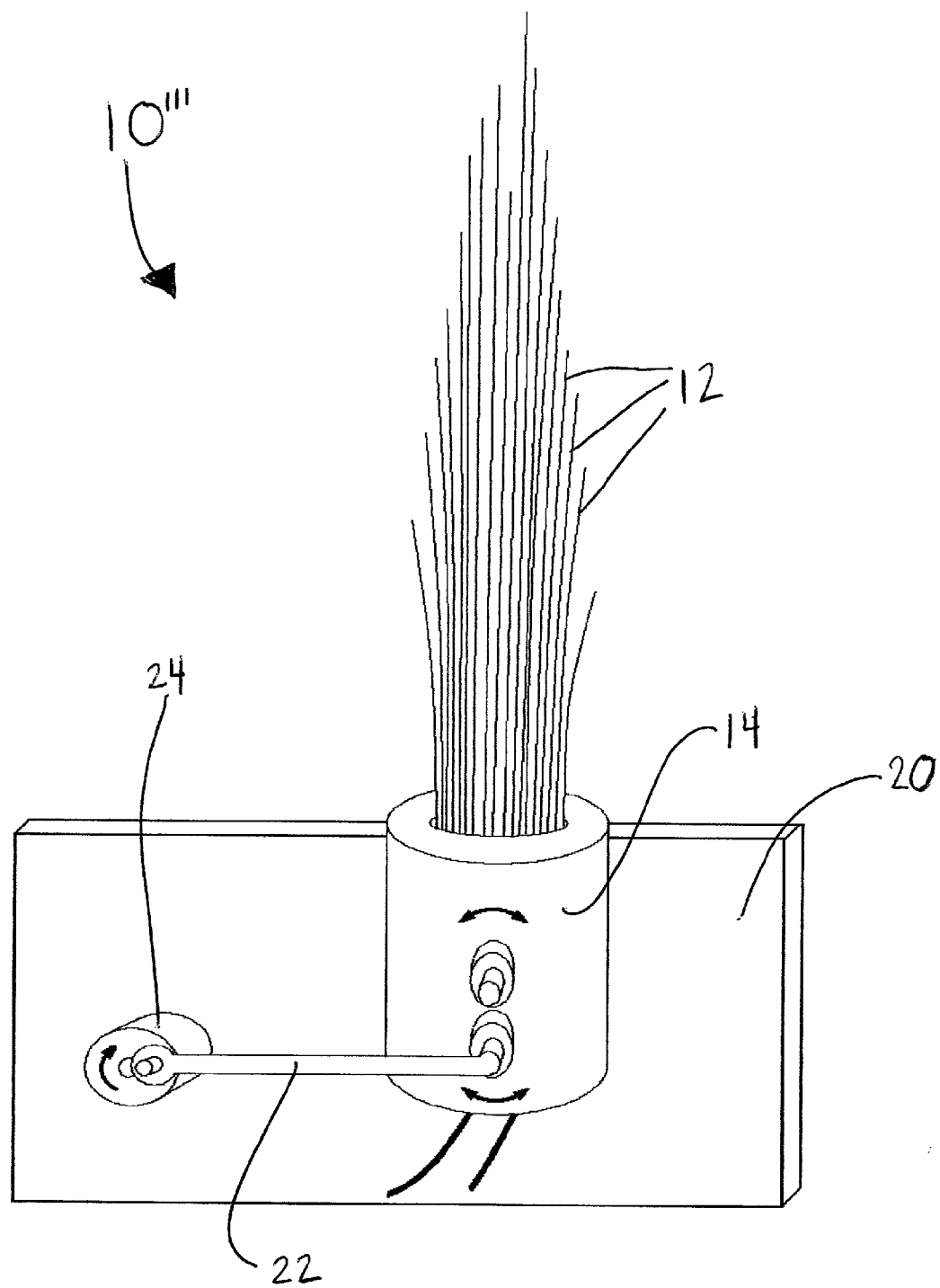

FIBER OPTIC DISPLAY APPARATUS AND METHODS OF OSILLATING ILLUMINATED OPTICAL FIBERS

CROSS REFERENCE TO RELATED APPLICATIONS

This application is a continuation in part of U.S. patent application Ser. No. 13/327,344, filed Dec. 15, 2011, which is incorporated herein and claims priority to U.S. Provisional Patent Application No. 61/423,572, filed Dec. 15, 2010, which is also incorporated herein.

TECHNICAL FIELD AND BACKGROUND OF THE INVENTION

The present invention relates to decorative fiber optic lamps, toys, and displays, and various new methods of moving and manipulating illuminated optical fibers. Fiber optics have been used for decades to create visually stimulating displays and decorations, even incorporating movement to enhance the visual effects. The type of movement has been thus far about an axis running longitudinally through the fibers within their holder. While this axial motion of the holder and fibers can create unique visual effects, the range of motion, responsiveness, and illumination options of the optical fibers is inherently limited. A need exists therefore to provide other types of fiber optical light displays that reciprocate across the longitudinal axis of fibers within their holding member.

SUMMARY OF THE INVENTION

One object of the present invention is to provide an apparatus that can create unique and visually stimulating optical displays and light patterns in space through the oscillation of illuminated optical fibers. Another object of the present invention is to provide a fiber optic display apparatus that places optical fibers in motion across the longitudinal axis of the holder of the fibers, like the fishing pole of a fisherman casting his line. Another object of the present invention to provide a fiber optic display apparatus that can utilize leverage to allow for smaller, more compact designs without compromising visual effects. Another object of the invention is to provide a fiber optic display apparatus that provides for many flexible design options as the axis of movement and point of contact for drive means coupling can exist in unlimited geometric arrangements and relationships. Yet another object is to provide a fiber optic display apparatus that provides greater, more effective responsiveness of all the optical fibers. Yet another object is to provide a fiber optic display apparatus that can reciprocate the fibers in a more predictable, linear range of motion. Yet another object is to provide a fiber optic display apparatus that requires less power to achieve the desired visual effects. Yet another object is to provide a fiber optic display apparatus that allows the holding member and fibers to move in roughly the same manner through space, despite their orientation to gravity. Yet another object is to provide a fiber optic display apparatus that has the ability to move silently when the fibers are cast in motion by means of electromagnetic coupling. Yet another object is to provide a fiber optic display apparatus that has the ability to derive its illumination from more than one light or color, detached from the holding member in the form of an array mounted to the housing with the fibers changing colors as they sweep across the array of separate individual lights. Yet another object is to provide a fiber optic display apparatus that has the ability to create complex multi-directional moving displays, where one entire embodiment can be mounted to a base plate that is itself caused to rotate, or reciprocate about another axis—also across the longitudinal axis of the fibers, creating two-dimensional, predictable patterns in space, such as a sine-wave, or visual representation of audio waves, similar to that of an oscilloscope.

These and other objects of the invention may be achieved in the preferred embodiments of the invention described below. One embodiment of the invention comprises a fiber optic display apparatus comprising one or more varying length fiber optic strands, either individual or in bundles, with one end of each strand or bundle being tightly bound to a holding member, the other end of the fiber optic strand or bundle, being unrestrained and allowed to move freely about. A light source such as, but not limited to, a light emitting diode is mounted within a holding member, oriented to expose and illuminate the rigidly bound fiber ends, causing light to be emitted from the free, unrestrained end of the fibers.

The holding member can be freely secured to a pivot point axis that is attached to, or part of a housing. This pivot point axis, can be positioned anywhere within the fiber holding member, and is non-parallel to the longitudinal axis of the holding member and fibers within the holding member, but relatively perpendicular to, or parallel to an imaginary line that is perpendicular to, the longitudinal axis of the tightly bound illuminated end of the fibers and holding member.

The fiber holding member can be functionally attached to a housing of any desired shape, in such a manner so that the holding member can move freely through its entire range of motion without restriction. The fiber holding member can also be freely connected to an actuator rod that moves back and forth on or within the housing with a push/pull motion. The actuator rod can be freely mounted at one end to the fiber holding member and at the other end freely mounted non-centrally to a cam wheel rotating about an axis. The cam wheel can be caused to rotate by means of a motor attached to the housing, or by means of a gear, sprocket, pulley, hand crank, or combination thereof. The rotation of the cam wheel coupled to the actuator rod, then to the holding member and fibers causes the holding member and fibers to travel back and forth about the pivot point axis that is relatively perpendicular to, or parallel to an imaginary line that is perpendicular to, the longitudinal axis of the optical fibers and holding member, creating random and constantly changing light display patterns.

Another object of the present invention comprises one or more varying length fiber optic strands, either individual or in bundles, with one end of each strand or bundle tightly bound to a holding member, and the other end of the fiber optic strand, or bundles, unrestrained and allowed to move freely about. The tightly bound fiber ends can be exposed to and illuminated by a plurality of lights, such as an array of LED's attached to the housing. As the holding member is reciprocated throughout its range of motion, the tightly bound fiber ends are exposed to the array light source, causing light to be emitted from the display end of the fibers corresponding to the individual colored light elements of the array, allowing for color changes within individual fibers as they sweep across a multi-colored light source.

The holding member can be freely secured to a pivot point axis that is attached to, or part of a housing. This pivot point axis within the fiber holding member is not parallel to the axis of fibers within the holding member, but relatively perpendicular to, or parallel to an imaginary line that is perpendicular to, the longitudinal axis of the holding member and fibers within the holding member. The fiber holding member can be functionally attached to a housing of any desired shape in such a manner so that the holding member can move freely through its entire range of motion without restriction. The fiber holding member can also be freely connected to an actuator rod that moves back and forth on or within the housing with a push/pull motion. The actuator rod can be freely mounted at one end to the fiber holding member, and at the other end freely mounted non-centrally to a cam wheel rotating about an axis. This cam wheel can be caused to rotate by means of a motor attached to the housing, or by means of a gear, sprocket, pulley, hand crank, or combination thereof. The rotation of the cam wheel coupled to the actuator rod, then to the holding member and fibers causes the holding member and fibers to travel back and forth about a pivot point axis that is relatively perpendicular to, or parallel to an imaginary line that is perpendicular to, the longitudinal axis of the optical fibers and holding member, creating random and constantly changing light display patterns.

Another embodiment of the present invention comprises one or more varying length fiber optic strands, either individual or in bundles with one end of each strand or bundle being bound tightly to a holding member, the other end of the fiber optic strand, or bundle(s), unrestrained and allowed to move freely about. The fibers can be illuminated by one of two methods. In the first method, the holding member contains a light source such as an LED, laser diode, mirror, prism, lens, or array thereof for each individual fiber or bundle. The light source can be mounted within or attached to the holding member and oriented in such a way as to expose and illuminate the rigidly bound fiber ends, causing light to be emitted from the unrestrained end of the fibers.

In the second method, the tightly bound fiber ends are exposed to and illuminated by a plurality of lights, such as a group of LED's attached to the housing and arranged as a linear array. As the holding member is reciprocated throughout its range of motion, the tightly bound fiber ends are exposed to the array light source, causing light to be emitted from the unrestrained end of the fibers corresponding to the individual light elements of the array, allowing for color changes within individual fibers as they sweep across a multi-colored light source.

The holding member can be freely secured to a pivot point axis that is attached to, or part of a housing, this pivot point axis within the holding member, is non-parallel to the longitudinal axis of fibers within the holding member. The preferred axis within the holding member is relatively perpendicular to, or parallel to an imaginary line that is perpendicular to, the longitudinal axis of the holding member and tightly bound optical fiber ends within the holding member. The holding member can also have attached to it one or more permanent magnets or coils of wire, magnetically coupled to react by means of attraction/repulsion to one or more corresponding permanent magnets, or coils of wire that are affixed to the housing.

As an electric current signal flows through the coil(s) of wire creating a magnetic field, the magnetic attraction/repulsion forces to the corresponding permanent magnet(s), cause the holding member to react magnetically, moving about its axis within the housing in a manner that corresponds to the polarity, strength and frequency of the electric current signal through the coil(s) of wire. The coils being energized by means of electrical current signals supplied by but not limited to: an amplifier, signal generator, microphone, radio, speaker output, AC line voltage, AC power supply, DC power supply.

Another embodiment of the present invention comprises a fiber optic display comprising one or more varying length fiber optic strands, either individual or in bundles, with one end of each strand or bundle being tightly bound to a holding member, the other end of the fiber optic strand, or bundle(s), unrestrained and allowed to move freely about. The holding member contains a light source, such as a light emitting diode mounted within the holding member and oriented to expose and illuminate the bound fiber ends, causing light to be emitted from the free, unrestrained fiber ends. The holding member can be freely secured to a pivot point axis that is attached to, or part of a housing. This pivot point axis within the fiber holding member is non-parallel to the longitudinal axis of the holding member and tightly bound fibers within the holding member, and approximately perpendicular to or parallel to an imaginary line that is perpendicular to, the longitudinal axis of the tightly bound illuminated fiber ends and holding member. The fiber holding member can be functionally attached to a housing of any desired shaped in such a manner so that the holding member can move freely through its entire range of motion without restriction. The fiber holding member can further incorporate a surface or channel, shaped and positioned in such a way as to allow a rotating cam wheel to come in contact with the surface or channel, causing movement of the holding member and illuminated fibers. The rotation of the cam wheel, by coming in contact with and agitating the surface or channel and holding member causes the holding member to move about its pivot point axis, causing the unrestrained ends of the fibers to move about, creating random and constantly changing single or multi-colored light display patterns in space.

According to yet another embodiment of the present invention a fiber optic display includes a base plate and the display is functionally attached to a second housing moveable about an axis extending through the base plate and the second housing, that is caused to reciprocate or rotate about its own axis that is relatively perpendicular to the pivot point axis of the holding member. The base plate can be made to oscillate or rotate on its axis by means of a cam wheel and channel, actuator rod, motor, gear, pulley, sprocket, magnetic coupling, or combination thereof. This second housing/base plate embodiment allows the display ends of the fibers to move about two approximately perpendicular axes simultaneously, creating constantly changing single or multi-colored light display patterns that respond to applied electrical signals, and have the ability to display wave forms such as sine-waves or sound, similar to waveforms displayed on an oscilloscope, with the movement of the base plate about its axis corresponding to the oscilloscope's "sweep" and the movement of the holding member and fibers about the pivot point axis corresponding to the scope's "response".

BRIEF DESCRIPTION OF THE DRAWINGS

FIG. 3 is a perspective view of an optical fiber display device according to another preferred embodiment of the invention;

FIG. 4 is a front elevation of an optical fiber display device according to another preferred embodiment of the invention;

FIG. 5 is a partial bottom plan view of the optical fiber display device of FIG. 6;

FIG. 6 is a perspective view of an optical fiber display device according to another preferred embodiment of the invention;

FIG. 18 is a perspective view of an optical fiber display device according to another preferred embodiment of the invention.

DESCRIPTION OF THE PREFERRED EMBODIMENTS OF THE INVENTION AND BEST MODE

Figure 1:
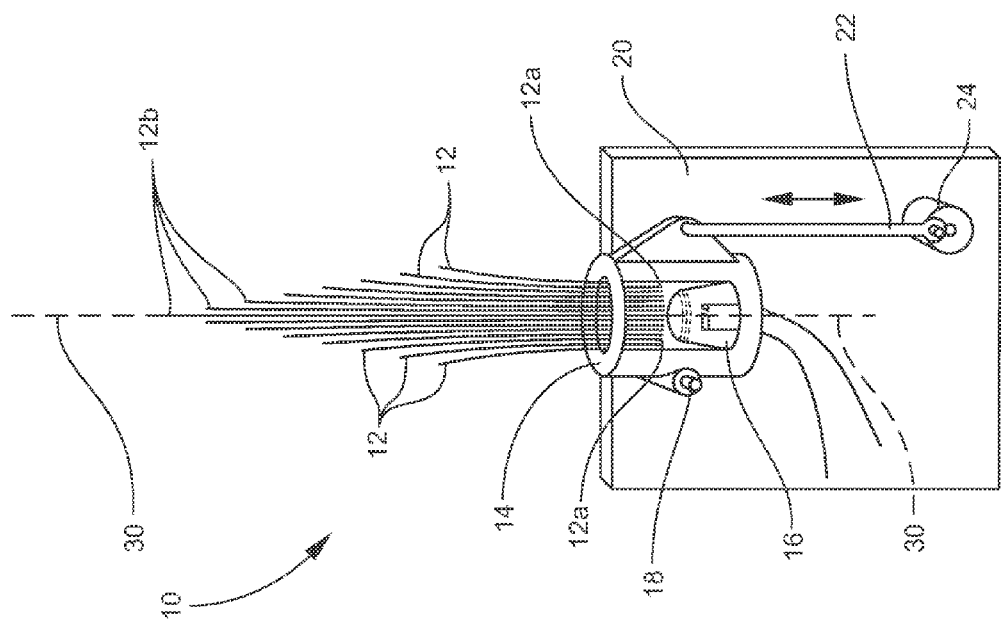
FIG. 1 is a perspective view of an optical fiber display device according to a preferred embodiment of the invention.

An optical fiber display device according to a preferred embodiment of the invention is illustrated in FIG. 1, and shown generally at reference numeral 10. The device 10, utilizes a locomotive-type method of oscillation and comprises varying length fiber optic strands 12 tightly bound to or within a holding member 14. The fiber strands 12 can be individually bound to the holding member 14 or bound as bundles. One end 12a of each strand 12 is bound to the holding member 14, and is referred to herein as the illuminated end 12a of the fibers 12. The other end 12b of the fiber optic strand 12 is unrestrained and allowed to move freely about, and is referred to herein as the display end 12b of the fibers 12. The holding member 14 is functionally attached to a housing 20.

In addition to the illuminated fiber ends 12a of the fibers 12, the holding member 14 contains a light source 16 to illuminate the fibers 12. The light source 16 can comprise one or more of the following: an incandescent bulb, light emitting diode (LED), laser diode, mirror, prism, and/or lens, for each individual fiber 12 or bundle of fibers 12. The light source 16 can be mounted within or to the holding member 14, and oriented in such a way as to expose the bound, illuminated fiber ends 12a, causing light to be emitted from the display end 12b of the fibers 12.

Alternatively, the light source can be affixed to the housing 20. The tightly bound illuminated fibers 12 can be exposed to and illuminated by a stationary light source, such as an incandescent bulb, LED, laser diode, mirror, prism, lens, or array of lights affixed to the housing 20, as illustrated in the embodiment shown in FIG. 4. An array of lights 216 can be attached to the housing 220. As the holding member 214 is moved about axis 218 throughout its range of motion, the illuminated fiber ends 212a are exposed to the stationary light source 216, causing light to be emitted from the display end 212b of the fibers 212. This configuration allows for color changes within the individual fibers 212 or bundles of fibers 212 as they sweep across a multi-colored light source 216, causing light to be emitted from the display end 212b of the fibers 212 corresponding to the individual colored light elements 226 of the array 216.

The holding member 14 of device 10 is freely secured to a pivot point axis 18 attached to the housing 20. Alternatively, the pivot point axis 18 can be an integral part of the housing 20. The pivot point axis 18 within the fiber holding member 14 is positioned non-parallel to the longitudinal axis 30 of the holding member 14 and fibers 12 within the holding member 14. Preferably, the axis 18 within the holding member 14 is relatively perpendicular to the longitudinal axis 30 of the holding member 14 and bound illuminated fibers 12 within the holding member 14. The holding member 14 can be functionally attached to the housing 20 of any desired shape in such a manner so that the holding member 14 can move freely through its entire range of motion without restriction.

The fiber holding member 14 can be freely connected to an actuator rod 22 that moves back and forth on or within the housing 20 with a push/pull motion. As shown in FIG. 1, one end of the actuator rod 22 is coupled to the fiber holding member 14, while the opposite end of the actuator rod 22 is freely mounted non-centrally to a rotating cam wheel 24. The cam wheel 24 can be driven by means of a motor attached to the housing 20. Alternatively, the cam wheel 24 can be freely mounted to the housing 20 and driven by means of a gear, sprocket, pulley, hand crank, motor or any combination thereof.

Figure 16:
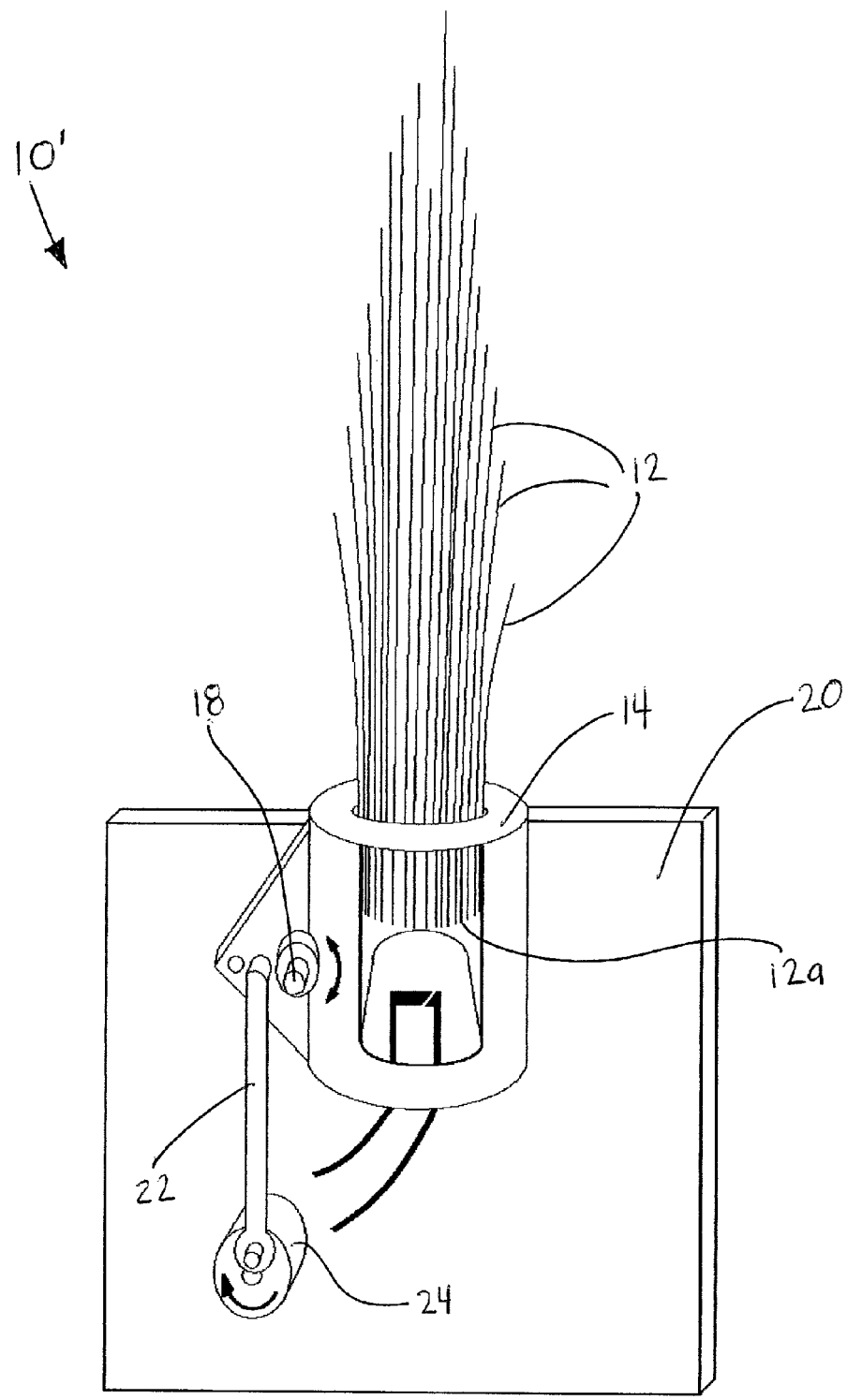
FIG. 16 is a perspective view of an optical fiber display device according to another preferred embodiment of the invention.
Figure 17:
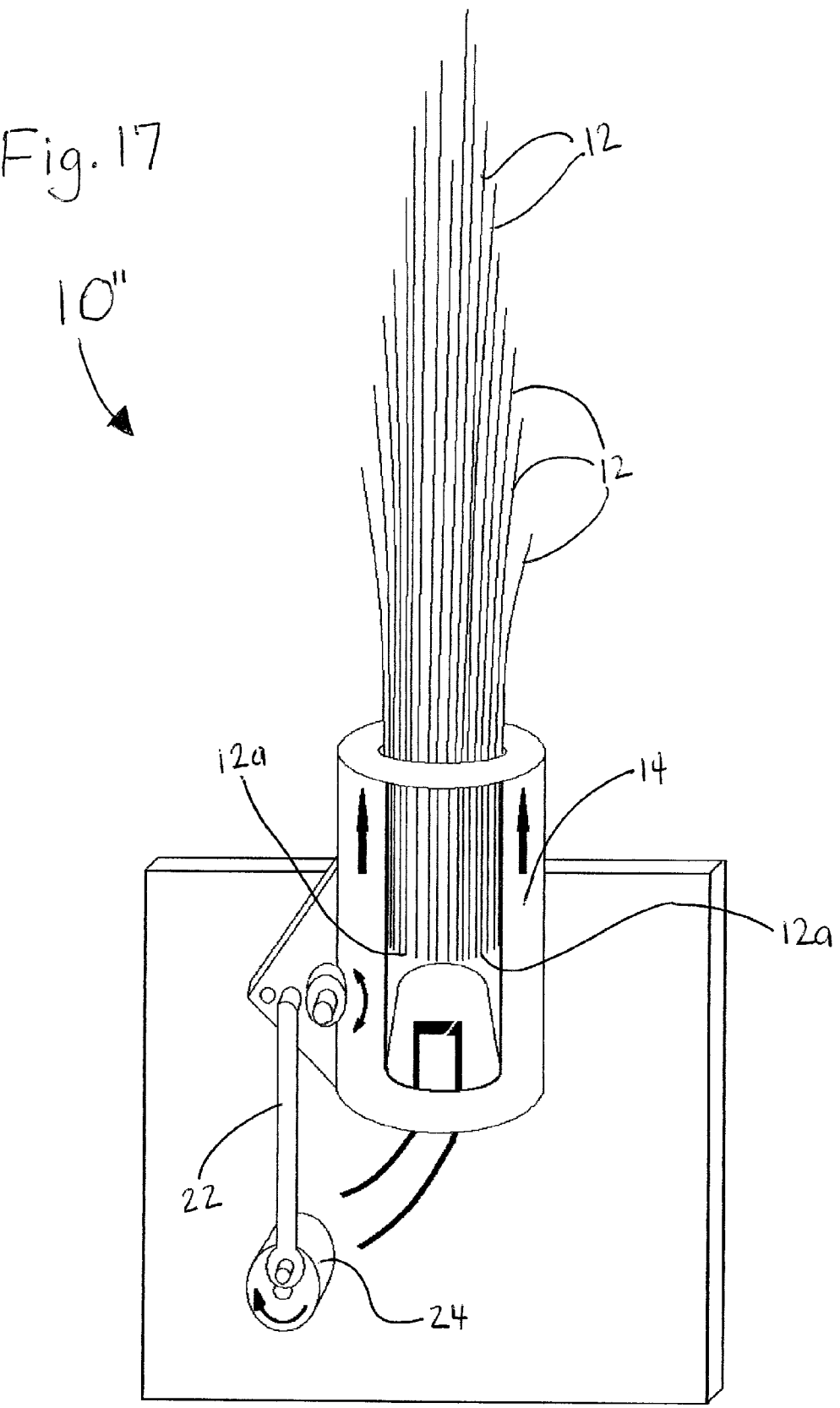
FIG. 17 is a perspective view of an optical fiber display device according to another preferred embodiment of the invention.

The rotation of the cam wheel 24 through the actuator rod 22, to the holding member 14 and fibers 12 causing the holding member 14 and fibers 12 to reciprocate back and forth about the pivot point axis 18 so as to allow the display end 12b of the fiber(s) 12 to shake back and forth, creating random and constantly changing single or multi-colored light display patterns. FIGS. 16-18 illustrate alternative embodiments 10', 10", 10''', respectively.

Figure 2:
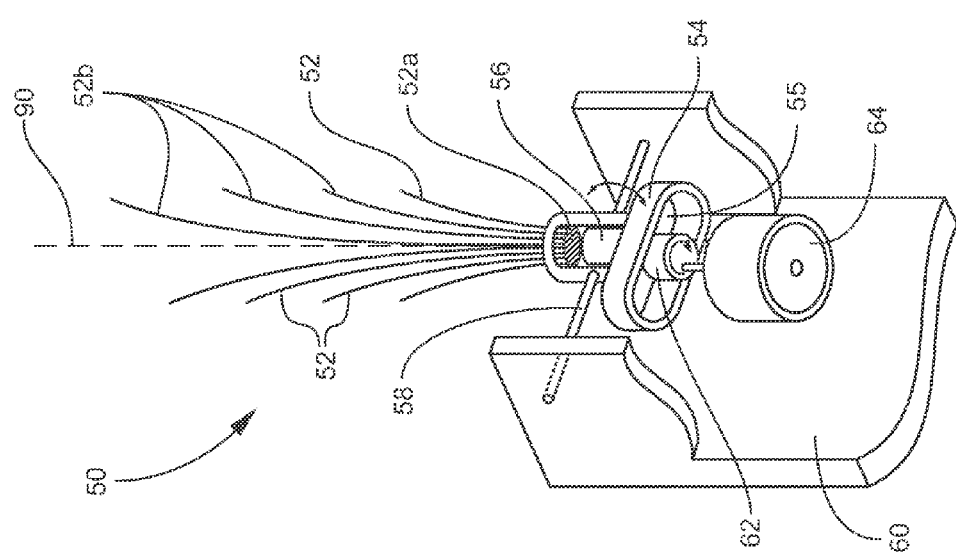
FIG. 2 is a perspective view of an optical fiber display device according to another preferred embodiment of the invention.

An optical fiber display device according to another embodiment of the invention is illustrated in FIG. 2, and shown generally at reference numeral 50. This embodiment 50 of an optical fiber display device utilizes an agitation-type method of oscillation. The device 50 comprises a plurality of varying length fiber optic strands 52, either individual or in bundles, with one end 52a of each strand 52 or bundle attached to or tightly bound inside a holding member 54, referred to herein as the illuminated fiber end 52a. The other end 52b of the fiber optic strand(s) 52 are unrestrained and allowed to move freely about, and are referred to herein as the display fiber end 52b of the fiber strand(s) 52.

In addition to the illuminated fiber ends 52a of the fibers 52, the holding member 54 contains a light source 56 to illuminate the fibers 52. The light source 56 can be an incandescent bulb, light emitting diode (LED), laser diode, mirror, prism, and/or lens, for each individual fiber 52 or bundle of fibers 52. The light source 56 can be mounted within, or to the holding member 54 and oriented in such a way as to expose the bound illuminated fiber ends 52*a*, causing light to be emitted from the display end 52*b* of the fibers 52.

Alternatively, the light source can be affixed to the housing 60. The bound illuminated fibers 52 being exposed to and illuminated by a stationary light source, such as an incandescent bulb, LED, laser diode, mirror, prism, lens, or array of lights affixed to the housing 60, such as the embodiment illustrated in FIG. 4.

As shown in FIG. 2, the holding member 54 being functionally secured to axis 58, that is attached to or part of housing 60. The housing 60 being any desired shape or form so that the holding member 54 can move freely through its entire range of motion without restriction. The pivot point axis 58 within the rigid fiber holding member 54 being non-parallel to the longitudinal axis 90 of the holding member 54 and fibers 52 within the holding member 54. Preferably, the pivot point axis 58 within the holding member 54 is relatively perpendicular to the longitudinal axis 90 of the bound illuminated end 52*a* of the fibers 52 within the holding member 54.

The fiber holding member 54 can include a channel or surface 55, shaped and positioned in such a way as to allow a cam wheel 62 to rotate inside of and come into contact with the channel or surface 55 causing reciprocation of the holding member 54 and fibers 52. The cam wheel 62 can be driven by means of a drive motor 64 attached to the housing 60. Alternatively, the cam wheel 62 can be freely mounted to the housing 60 and driven by means of a gear, sprocket, pulley, hand crank, motor or combination thereof. The rotation of the cam wheel 62, by coming in contact with and agitating the channel or surface 55 within the holding member 54 causes the holding member 54 to reciprocate about the pivot point axis 58, which in turn causes the display ends 52*b* of the fiber(s) 52 to reciprocate about, creating random and constantly changing light display patterns.

In another embodiment utilizing agitation oscillation illustrated in FIG. 3 and shown generally at reference numeral 150, the holding member 154 can be freely secured to a first pivot point axis 158 that is also freely attached to a second pivot point axis 159 within the housing 160. Both axes 158, 159 within the holding member 154 are relatively perpendicular to the longitudinal axis 130 of the fibers 152 within the holding member 154. Preferably, the axes 158, 159 are approximately perpendicular to the tightly bound illuminated ends 152*a* of the fibers 152. This method of attachment acts as a u-joint, allowing free travel of the holding member 154 in two directions simultaneously, which in turn creates additional display patterns and visual effects giving the holding member 154 and fibers 152 the ability to move about through a two-dimensional range of motion.

The fiber holding member 154 is positioned within the housing 160 in such a manner so that the holding member 154 can move freely about, without coming into contact with the housing 160 throughout its entire range of motion. The holding member 154 includes a channel or surface 155, shaped and positioned in such a way as to allow a cam wheel unit 162 to rotate inside of and come into contact with the interior of the holder 154 causing movement of the holder 154 and illuminated fibers 152.

Alternatively, the holding member 154 can be attached at one or more points to a flexible membrane, springs, or other yieldable material in such a way as to allow two-dimensional movement of the holding member 154 about multiple axes that are perpendicular to the tightly bound illuminated ends 152*a* of the fibers 152. This method of attachment is similar to how a speaker cone is attached to its speaker housing by means of a flexible foam membrane.

An optical fiber display device according to another embodiment of the invention is illustrated in FIG. 4, and shown generally at reference numeral 200. This embodiment 200 of the invention utilizes a magnetic coupling method of oscillation. The device 200 comprises a plurality of varying length fiber optic strands 212, either individual or in bundles, with one end 212*a* of each strand 212, referred to herein as the illuminated end 212*a*, bound tightly on or inside a holding member 214. The other end 212*b* of the fibers 212, referred to herein as the display end 212*b*, are unrestrained and allowed to move freely about, thereby.

The illuminated fiber ends 212*a* can be exposed to and illuminated by a stationary light source 216, such as a multi-colored LED array 216 of multiple individual lights 226 affixed to the housing 220, as shown in FIG. 4. Alternatively, the light source 216 can be an incandescent bulb, mirror, prism, lens, or array thereof. As the holding member 214 is moved throughout its range of motion, the illuminated fiber ends 212*a* are exposed to the stationary light source 216, causing light to be emitted from the display end 212*b* of the fibers 212 allowing for color changes within the fibers 212 as they sweep across the multi-colored array 216 corresponding to the individual colored light elements 226 of the array 216. Alternatively, the holding member 214 can contain the light source 216, such as in the embodiment 10 illustrated in FIG. 1, in which the housing 14 contains the light source 16 to illuminate the fibers 12.

The holding member 214 is freely secured to a pivot point axis 218 attached to, or part of the housing 220. This pivot point axis 218 within the holding member 214 is non-parallel to the longitudinal axis 230 of the holding member 214 and the fibers 212 within the holding member 214. Preferably, the axis 218 within the holding member 214 is relatively perpendicular to the longitudinal axis of the holding member 214 and illuminated end 212*a* of the fibers 212 within the holding member 214.

The holding member 214, can be positioned on or within the housing 220 and shaped in such a manner so that the holding member 214 can move freely through its entire range of motion, across its pivot point axis 218 without restriction. As shown in FIG. 4, one or more permanent magnets 232 are affixed to the holding member 214, and corresponding electromagnetic coils 240, 242 are affixed to the housing 220. The magnet 232 is affixed to the holding member 214, and coils 240, 242 are affixed to the housing 220. The magnet 232 and coils 240, 242 are positioned to react magnetically with attraction/repulsion forces between their corresponding attachments so that an electrical current signal supplied to the coils 240, 242 causes movement of the holding member 214 about its axis 218.

An applied electric current signal flowing through the wire coils 240, 242, creating magnetic attraction/repulsion forces between the coils 240, 242 and corresponding magnet 232, causes the holding member 214 to move upon its axis 218 within the housing 220 in a manner directly corresponding to the polarity, strength and frequency of the electric current signal. The coils 240, 242 can be energized by means of an electric current signal supplied by an electrical source not shown in FIG. 4, such as an amplifier, signal generator, microphone, speaker output, radio, AC line voltage, AC/DC power supply.

In an alternative embodiment illustrated in FIG. 6, and shown generally at reference numeral 250, a holding member 254 holds fiber optic strands 252 and contains an illuminated light source, such as a plurality of LEDs 256, 257. The LEDs 256, 257 can be mounted within or on the holding member 254, and oriented to expose and illuminate the tightly bound fiber ends 252a, causing light to be emitted from the display ends 252b of the fibers 252. The holding member 254 and strands 252 have a longitudinal axis shown at reference numeral 290 in FIG. 6.

As shown in FIGS. 5 and 6, one pair of permanent magnets 270, 274 are attached to the housing 260 combine to create an individual polarized magnetic field. Another pair of permanent magnets 272, 276 attached to the housing 260 combine to create an individual polarized magnetic field of the opposite polarity. An electric current signal of one polarity conducting through a wire coil 280 attracts the wire coil 280 and the holding member 254 towards the magnets 270, 274 while being repelled away from the other pair of magnets 272, 276. When the polarity of the electrical current signal changes, the opposite effect takes place and the coil 280 and holding member 254 are then repelled away from the magnets 270, 274 while being attracted toward the other pair of magnets 272, 276. This type of magnetic coupling creates movement of coil 280, holding member 254 and fibers 252 that is directly proportional to the strength, polarity, and frequency of the electric current signal flowing through coil 280.

Figure 7:
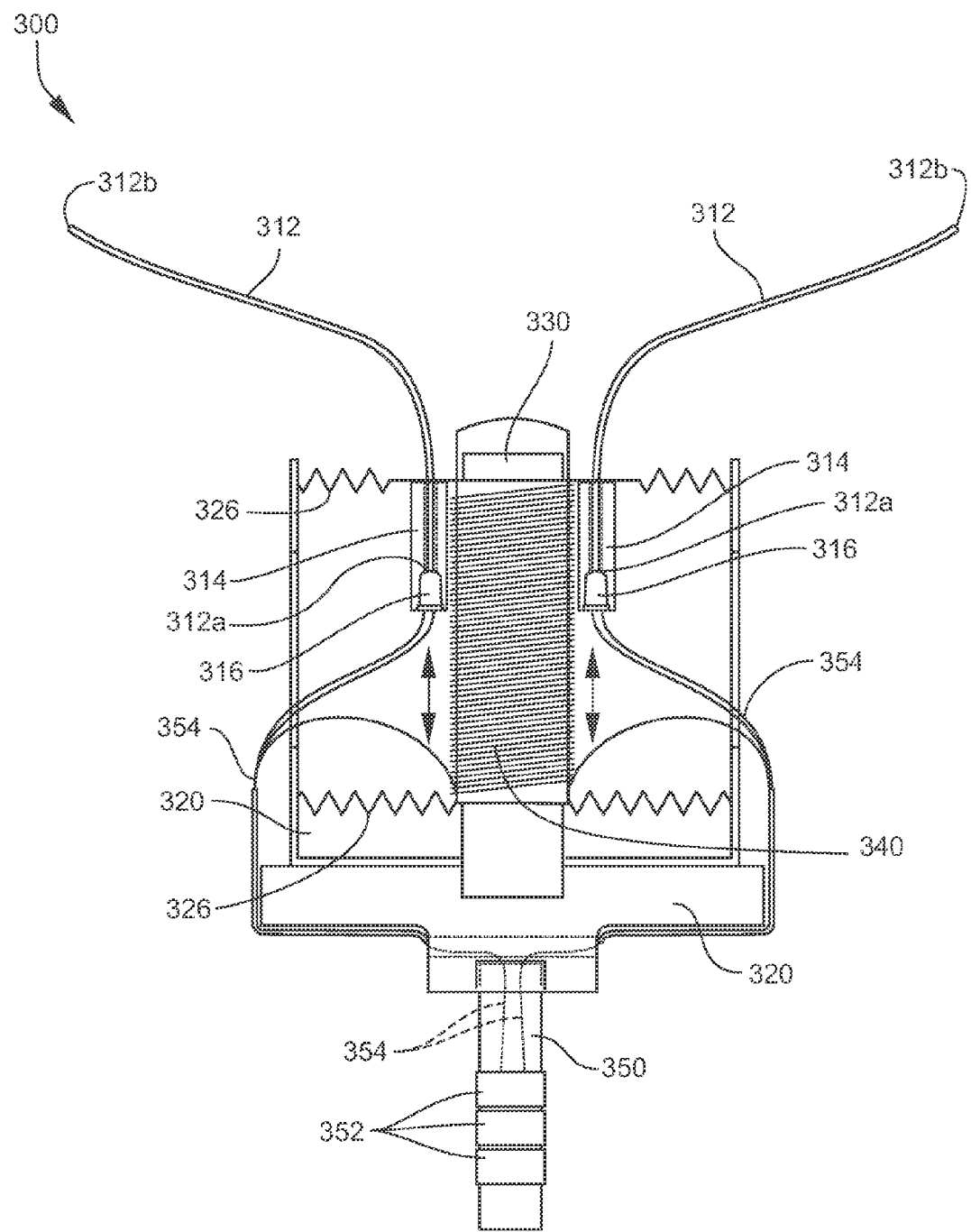
FIG. 7 is a schematic view of an optical fiber display device according to another preferred embodiment of the invention.

A fiber optic display device according to another embodiment of the invention is illustrated in FIG. 7, and shown generally at reference numeral 300. This embodiment 300 of the invention can utilize linear voice coil motor oscillation or speaker motor oscillation. The device 300 comprises a plurality of variable length fiber optic strands 312, either individual or in bundles, with one end 312a of each strand 312 bound tightly inside a rigid holder 314, referred to herein as the illuminated end 312a of the fibers 312a. The other end 312b of each fiber optic strand 312, referred to herein as the display end 312b, is unrestrained and allowed to move freely about.

Each rigid holder 314 contains an illuminated light source 316 such as an incandescent bulb, LED, laser diode, mirror, prism, lens, or array thereof for the individual fibers 312. The light source 316 can be mounted within the holder 314 and oriented in such a way as to expose and illuminate the rigidly bound fiber ends 312a, causing light to be emitted from the display end 312b of the fibers 312. The fiber holder 314 can also contain a colored transparent filter placed between the light source 316 and the illuminated fibers 312 so as to add one or more colors to the fiber display 300 while incorporating a single light source 316. Alternatively, the tightly bound illuminated fibers 312 can be exposed to and illuminated by a stationary light source such as an incandescent bulb, LED, laser diode, mirror, prism, lens, or array thereof affixed to a rigid housing 320. As the holder 314 is caused to move throughout its range of motion, the illuminated fiber ends 312a can be exposed to the stationary light source, causing light to be emitted from the display end 312b of the fibers 312. This method of illumination allows for color changes within individual fibers 312 as they sweep across a multicolored light source, and reduce the weight of the moving rigid holder 314. The rigid holders 314 and fibers 312 can be mounted to a magnet, speaker cone, coil housing, or coil(s) located axially either closely within or around one or more cylindrical permanent magnets or coils that is also mounted axially within the linear voice coil motor housing 320.

As shown in FIG. 7, the rigid holders 314 and fibers 312 can be mounted proximate a magnet 330 and electromagnetic wire coil 340. This freely moving magnet 330 or electromagnetic wire coil(s) 340 are axially attached to the inner or outer circumference of one or more flexible members such as speaker spiders 326. Alternatively, the flexible members can be a membrane or spring assembly. The flexible member 326 has its opposite circumference mounted axially to the linear voice coil motor housing 320. This relationship allows the rigid holder 314 and fibers 312 to move freely in a one-dimensional motion along the axis of the housing 320 and permanent magnets 330. The rigid holder 314 and fibers 312 are oriented either above, below, or extending through the magnet 330 in such a manner as to allow the illuminating fiber ends 312a to extend in a general direction away from the axial center of the voice coil motor.

Figure 8:
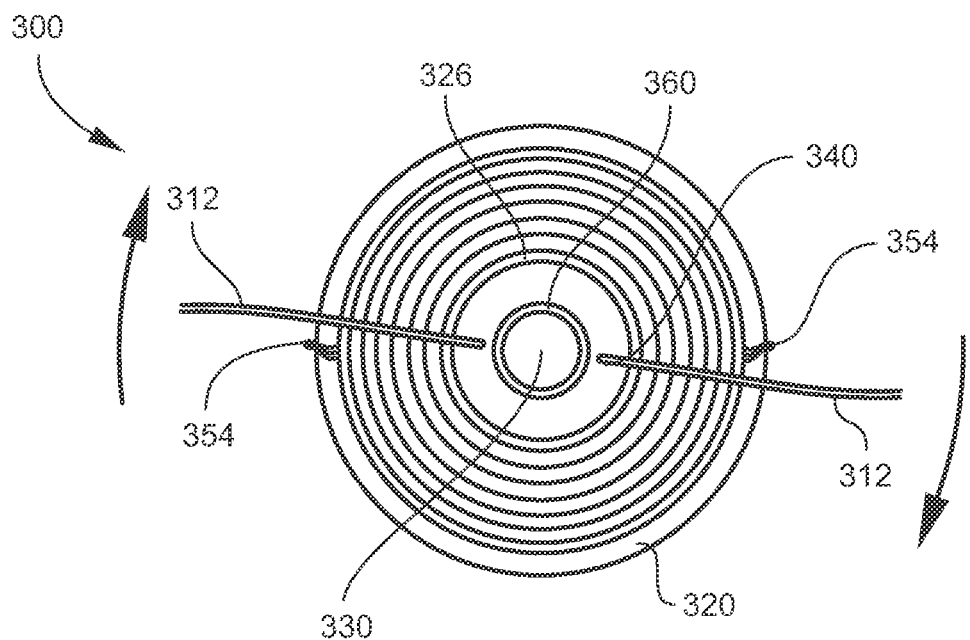
FIG. 8 is a top plan view of the optical fiber display device of FIG. 7.
Figure 9:
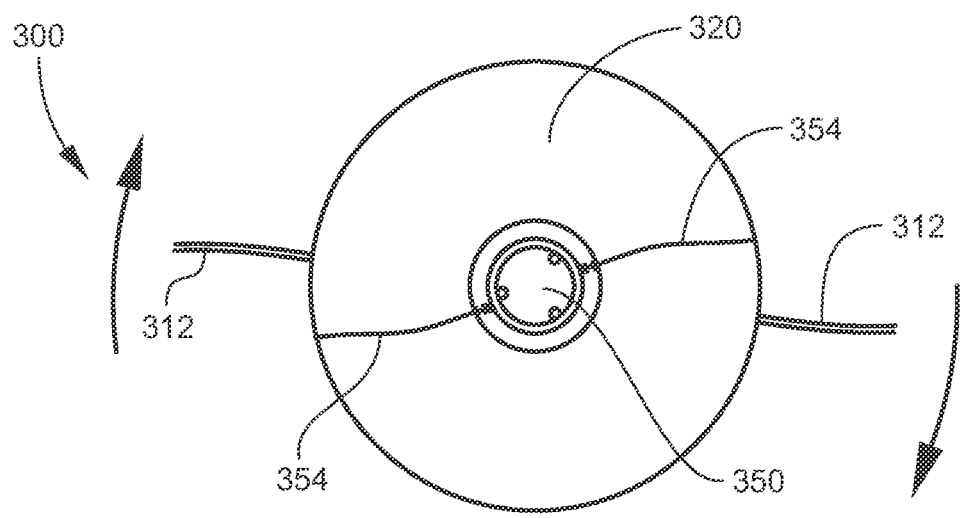
FIG. 9 is a bottom plan view of the optical fiber display device of FIG. 7.
Figure 10:
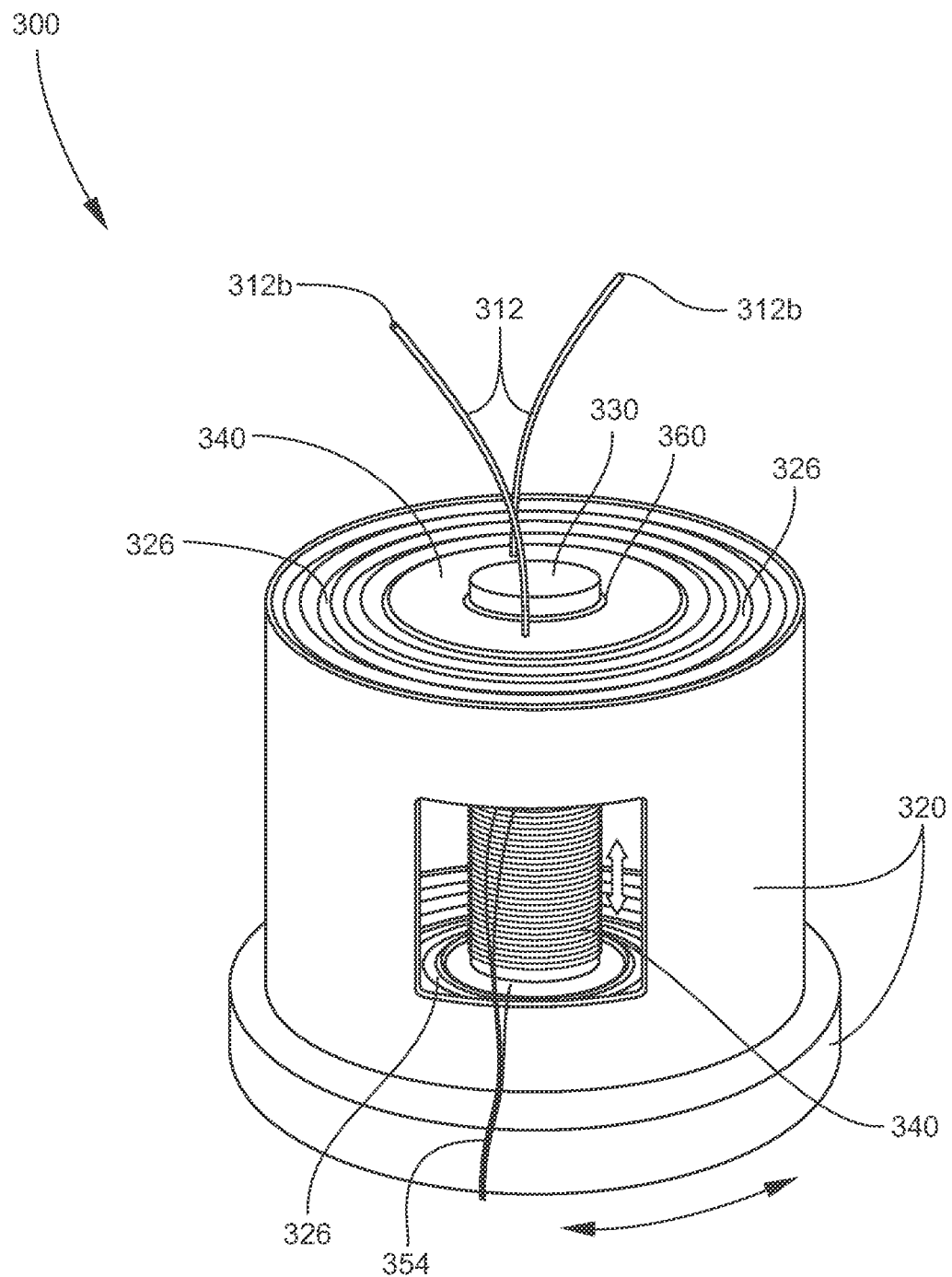
FIG. 10 is a perspective view of the optical fiber display device of FIG. 7.
Figure 11:
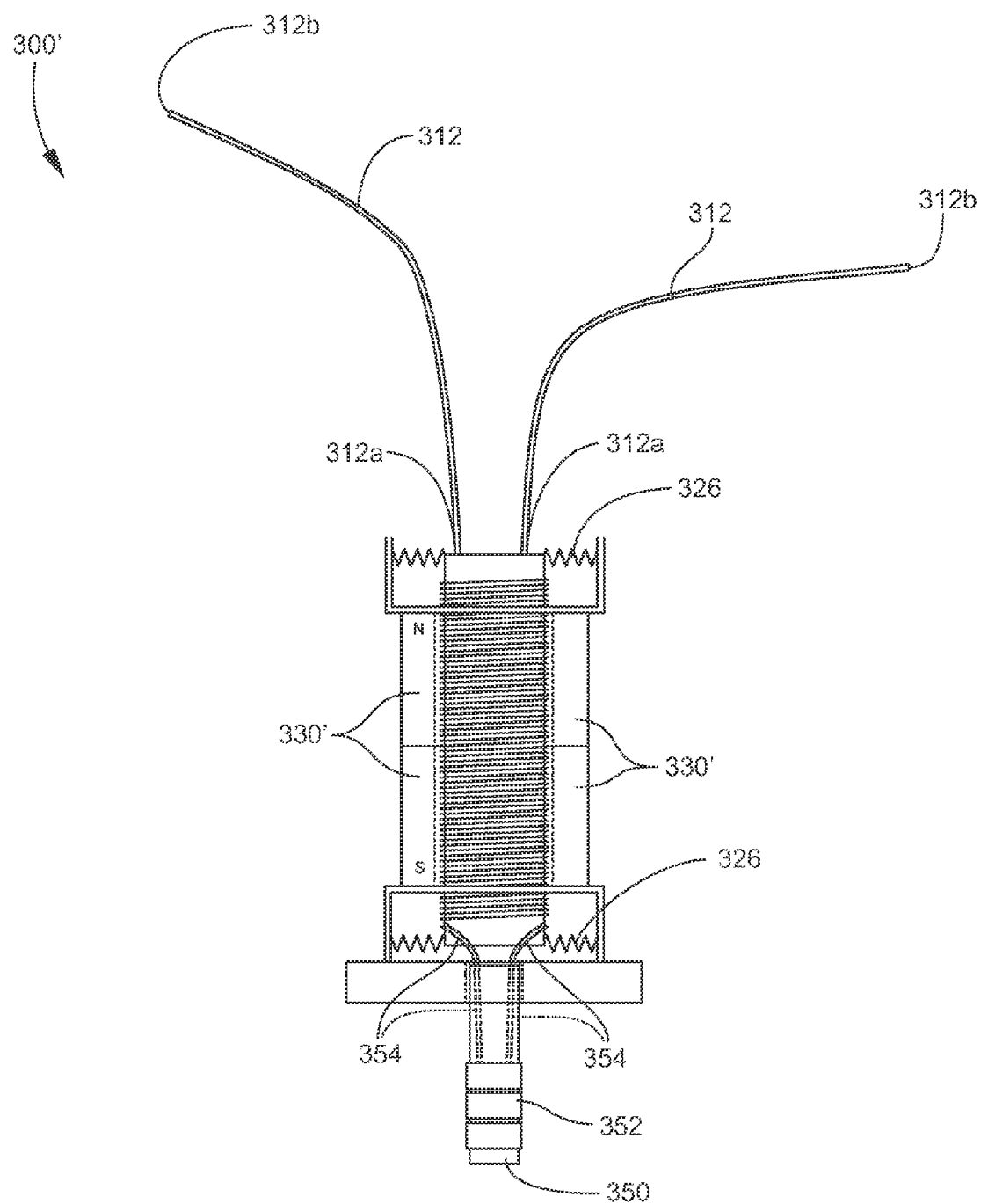
FIG. 11 is a schematic view of an optical fiber display device according to another embodiment of the invention.

As shown in FIGS. 8 and 10, an air gap 360 exists between the magnet 330 and the speaker spiders 326. An axis shaft 350 is functionally connected to the voice coil motor and attached to the housing 320. Brush contacts 352 are positioned on the axis shaft 350. Wiring 354 connected to the motor extends through the interior of the shaft 350 into the housing 320 and connects to the coil(s) 340 and the light source 316. Electrical signals conducting through the wire coil(s) 340 create changing magnetic fields in the coil(s) 340 and cause magnetic attraction/repulsion forces between the coil(s) 340 and magnet(s) 330 mounted to the housing, causing the rigid holder 314 and fibers 312 to move back and forth in response to those signals. In this linear voice coil motor method of oscillation the housing 320, which has axially mounted magnets 330 and coil(s) 340, and freely holds the rigid fiber holder 314 and its own magnet(s) 330 and coil(s) 340, can act as a sub-housing and be freely and axially attached to a second rigid main housing by its axis. The sub-housing can then be rotated or oscillated about the axis that is contained on or in this main housing. The housing and sub-housing can be shaped in any way and the sub-housing can be caused to oscillate or rotate on its axis by means of a cam wheel and channel, actuator rod, motor, gear, pulley, sprocket, voice coil motor, hand crank, or combination thereof. This second axis/sub-housing method allows the display ends 312b of the fibers 312a to move about two axes simultaneously, creating constantly changing single or multi-colored light display patterns that respond to a given electrical signal and have the ability to offer a rough but accurate visual display of sound, similar to audio waves displayed on an oscilloscope. In an alternative embodiment illustrated in FIG. 11, and shown generally at reference numeral 300', cylindrical magnets 330' are positioned adjacent the coil(s) 340.

Figure 12:
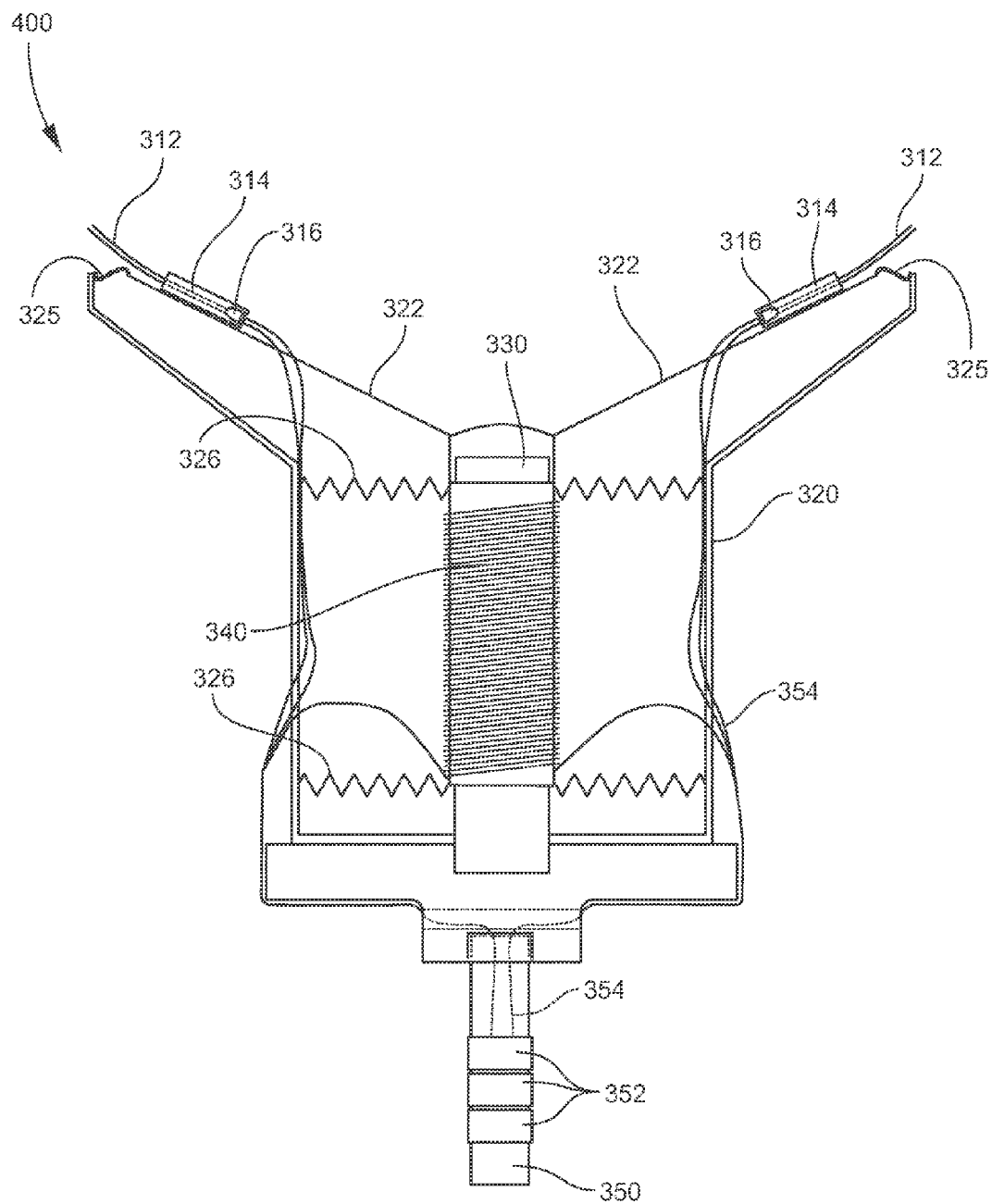
FIG. 12 is a schematic view of an optical fiber display device according to another embodiment of the invention.

In an alternative embodiment illustrated in FIG. 12 and shown generally at reference numeral 400, the cylindrical magnet 330 and electromagnetic wire coil 340 are mounted axially within the linear voice coil motor housing 320. The housing 320 includes a speaker cone 322. Flexible membranes 325 are positioned on the speaker cone 322. The rigid holder 314 and the fibers 312 can be mounted to the cone 322, which is located proximate the cylindrical magnet 330 and coil 340 that is also mounted axially within the linear voice coil motor housing 320. Alternatively, the holder 314 and fibers 312 can be attached to the magnet 330, coil 340 or housing 320. The freely moving magnet or coil 340 is axially attached to one or more flexible members such as speaker spiders 326, or alternatively, to a membrane or spring assembly. The cylindrical magnet 330 is attached to the housing 320. The opposite circumference of the flexible member 326 is mounted axially to the linear voice coil motor housing 320. This relationship allows the rigid holder and fibers attached to the magnet, or coil(s), coil mount, and speaker cone to move freely in a one-dimensional motion along the axis of the housing and the permanent magnet(s). The rigid holder and fibers can be oriented either above, below, or extending through the magnet, magnet holder, speaker cone/coil housing in such a manner as to allow the illuminating fiber ends to extend in a general direction away from the axial center of the voice coil motor.

Figure 13:
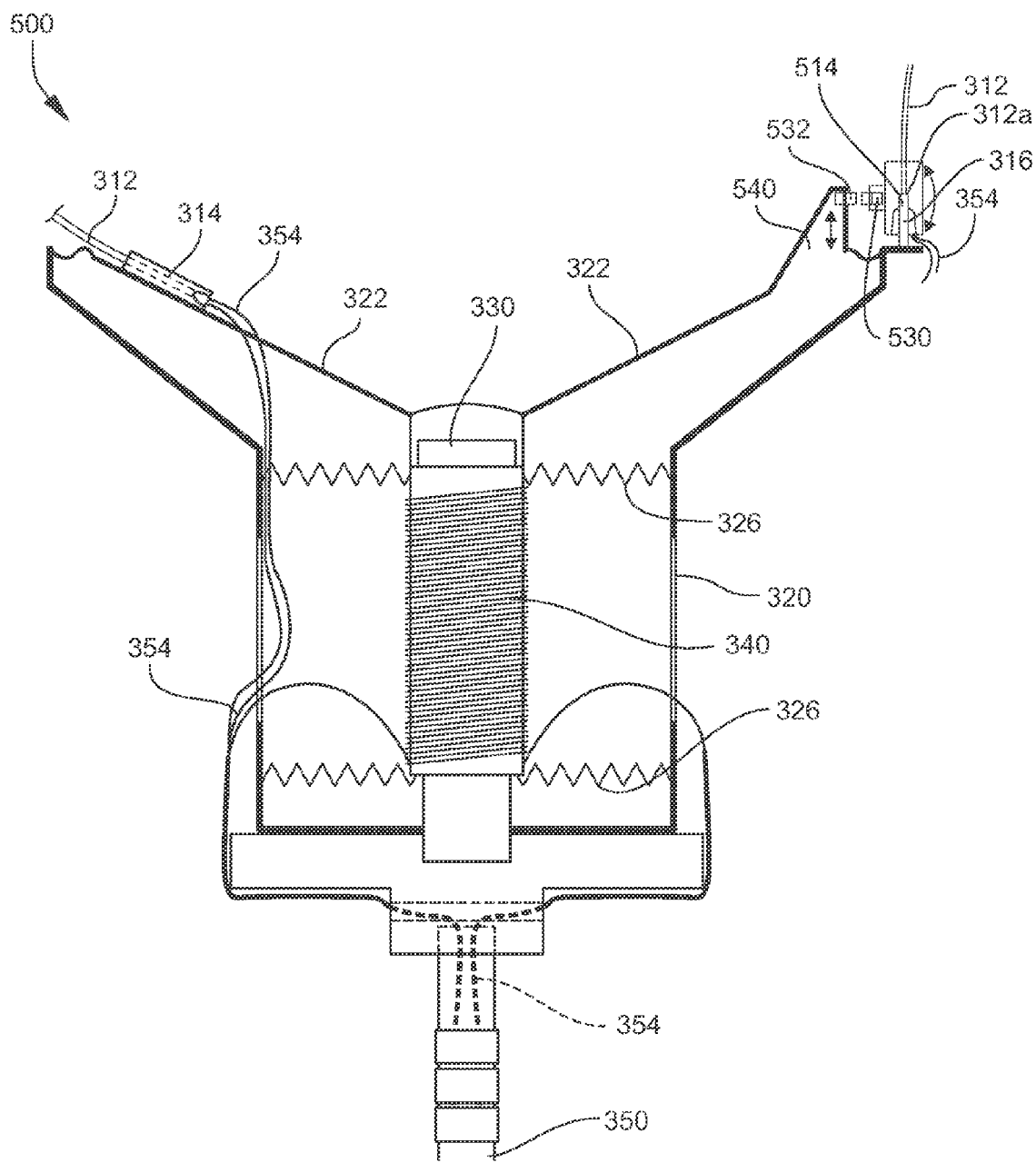
FIG. 13 is a schematic view of an optical fiber display device according to another embodiment of the invention.

In another embodiment illustrated in FIG. 13 and shown generally at reference numeral 500, at least one rigid fiber holder 514 can be freely secured to a pivot point axis 518 that is attached to, or part of the housing 320. The pivot point axis 518 within the rigid holder 514 is non-parallel to the axis of fiber 312 within the rigid holder 518. Preferably, the axis 518 within the rigid holder is relatively perpendicular to the tightly bound illuminated end 312a of the fiber 312. The housing 320 can be shaped in any manner.

At least one permanent driven magnet 530 can be attached to the rigid holder 518 and positioned in such a way as to react magnetically by means of attraction/repulsion, to one or more corresponding permanent driving magnets 532, which are permanently affixed to a moveable member such as part 540 of the speaker cone 322, or alternatively a coil housing, coil(s), or second permanent magnet, which is located axially closely within or around one or more cylindrical permanent magnets or coils mounted axially within the linear voice coil motor housing 320. This freely moving driving magnet, magnet holder, speaker cone, coil housing, or coil(s) can be axially attached to the inner or outer circumference of one or more flexible members such as a speaker spider, membrane or spring assembly. The opposite circumference of the flexible member is mounted axially to the linear voice coil motor housing 320. This relationship allows the magnet(s) or coil(s), coil mount, speaker cone, and driving magnet to move freely in a one-dimensional motion along the axis of the housing and permanent magnet (s) 530. This one-dimensional linear motion of the driving magnet(s) in turn causes a corresponding motion by means of magnetic coupling to the driven magnet and rigid holder 514 about its pivot point axis 518.

Figure 14:
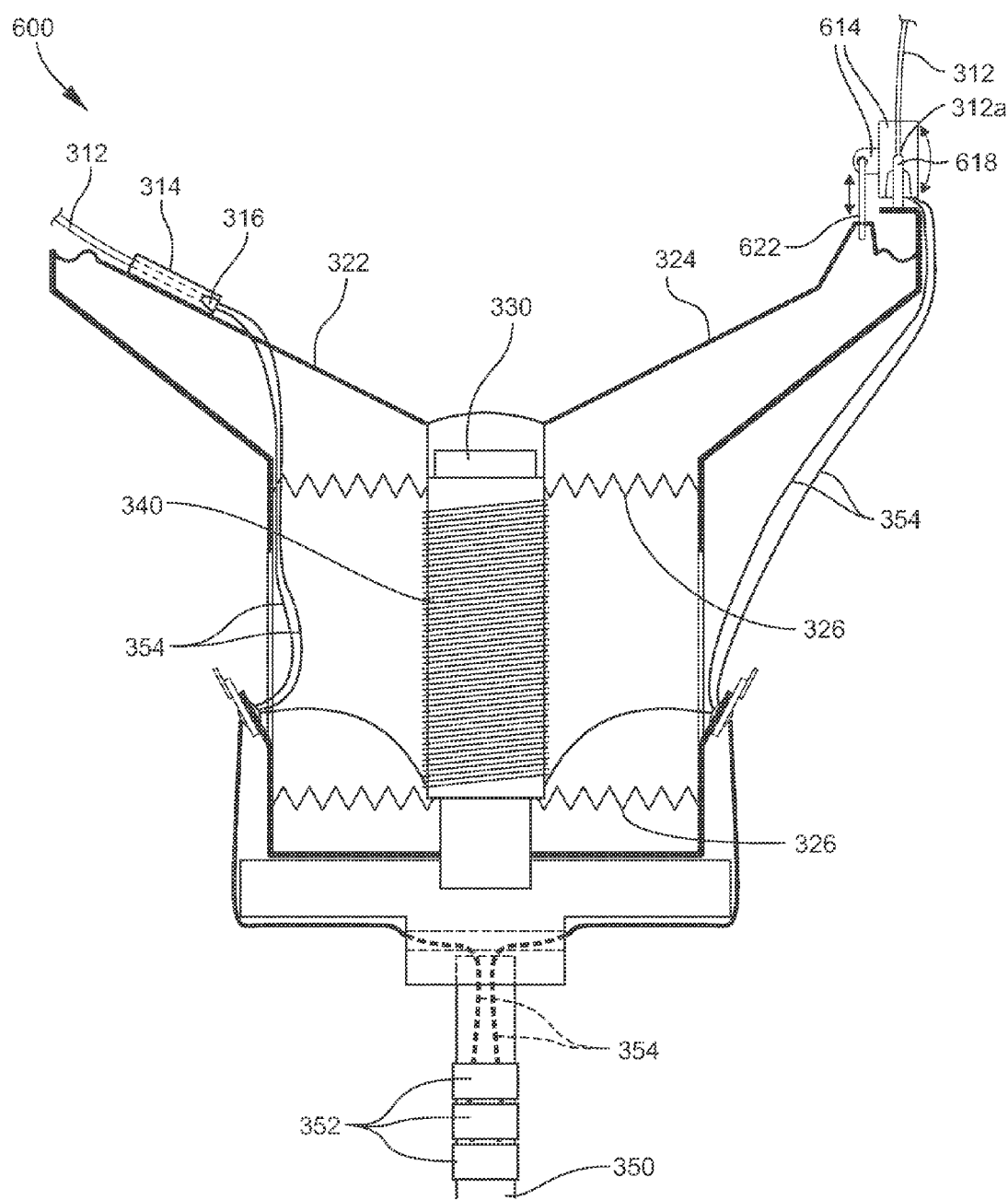
FIG. 14 is a schematic view of an optical fiber display device according to another embodiment of the invention.

In another embodiment of the invention illustrated in FIG. 14, and shown generally at reference numeral 600, at least one rigid fiber holder 614 is freely secured to a pivot point axis 618 that is attached to, or part of the housing 320. This pivot point axis 618 is non-parallel to the axis of fibers 312 within the rigid holder 618. Preferably, the axis 618 within the rigid holder is relatively perpendicular to the tightly bound illuminated end 312a of the fibers 312. The pivot point axis 618 of the rigid holder 614 is freely connected to an actuator rod 622 connected to the housing 320. The rod 622 moves back and forth, and is driven by the movement of the speaker cone 322. The motion of the actuator rod 622 causes the holder 614 and fiber 312 to travel back and forth about the pivot point axis 618 so as to allow the fiber 312 to shake back and forth along a line approximately perpendicular to the axis of the tightly bound illuminated optical fibers 312a, creating random and constantly changing single or multi-colored light display patterns.

Figure 15:
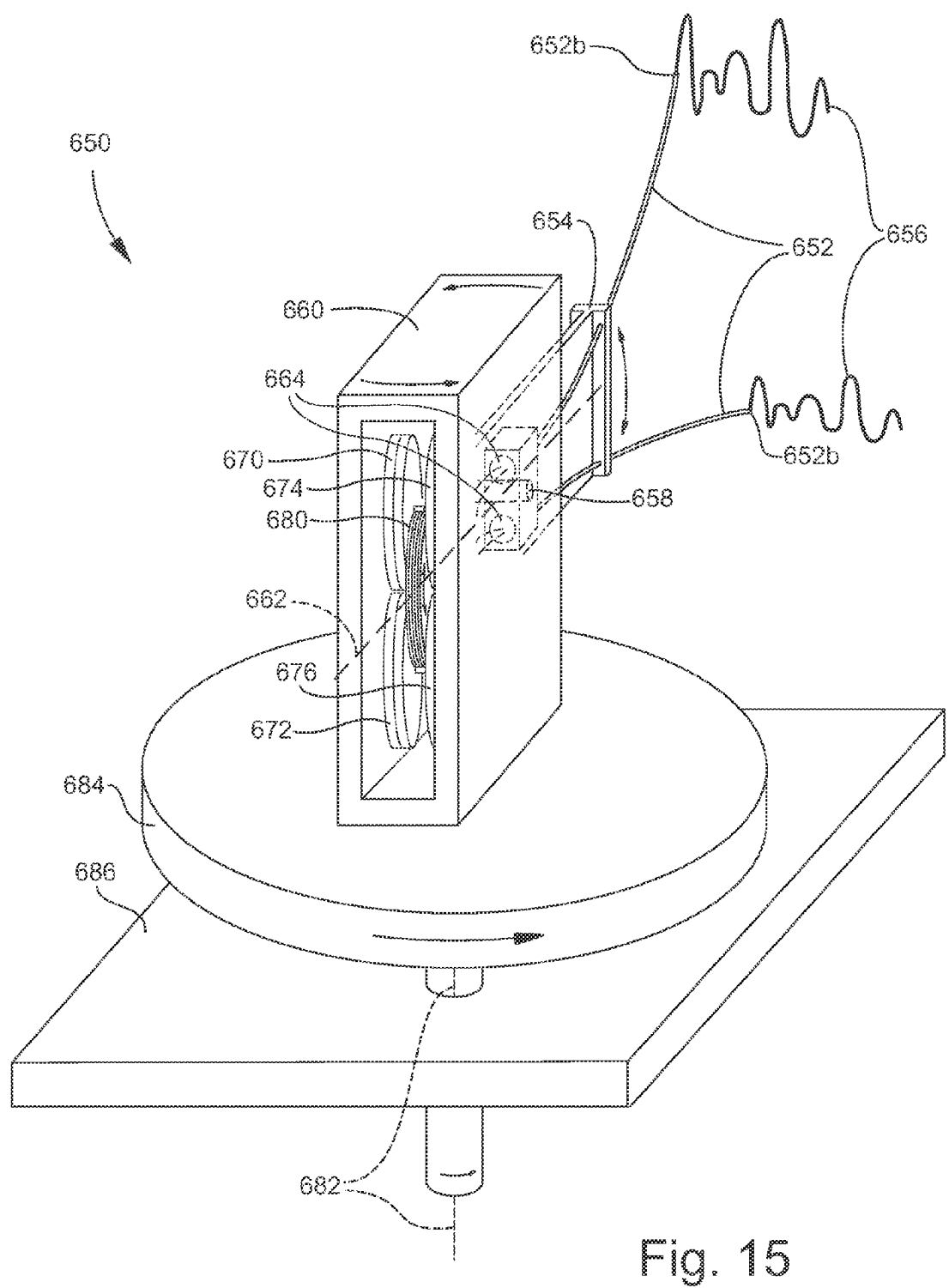
FIG. 15 is a perspective view of an optical fiber display device according to another preferred embodiment of the invention.

An optical fiber display device according to another preferred embodiment of the invention is illustrated in FIG. 15 and shown generally at reference numeral 650. This embodiment 650 of the invention utilizes a magnetic coupling method of oscillation, as in the device 250 illustrated in FIG. 6, combined with a second simultaneous movement of the embodiment 650, about an axis 682 that is non-parallel to the longitudinal axis 662 of the holding member 654 and relatively perpendicular to the pivot point axis 658 of the holding member 654.

The device 650 comprises optical fibers 652, an electromagnetic coil 680, and light source(s) affixed to the fiber holding member 654. The holding member 654 is functionally attached to the housing 660 and movable about the pivot point axis 658. The pivot point axis 658 is relatively perpendicular to the longitudinal axis 662 of the holding member 654 and optical fibers 652 within the holding member 654. Permanent magnets 670, 672, 674, 676, are attached within the housing 660. The housing 660 is affixed to a base plate 684 that is functionally attached to a second housing 686 and moveable about axis 682 by means of reciprocation or rotation. The axis 682 is relatively perpendicular to the pivot point axis 658 of the holding member 654. The base plate 684 can be caused to reciprocate or rotate upon its axis 682 by means of direct coupling to a cam wheel and channel, actuator rod, motor, gear, pulley, sprocket, magnetic coupling, hand crank, or combination thereof, either directly attached or functionally attached to the second housing 686.

Device 650 allows the unrestrained ends 652b of the fibers 652 to move about pivot point axis 658 and axis 682 simultaneously, creating constantly changing random or predictable light display patterns 656 in response to given electrical current signals through coil 680. The device 650 can visually simulate the display of an oscilloscope, with the movement of the base plate 684 and fibers 652 about axis 682 acting as the oscilloscope's "sweep", and the movement of the holding member 654 and fibers 652 about pivot point axis 658 representing the "response" of an electric current input signal.

An optical fiber display device and methods for oscillating optical fibers are described above. Various changes can be made to the invention without departing from its scope. The above description of the preferred embodiments and best mode of the invention are provided for the purpose of illustration only and not limitation—the invention being defined by the following claims and equivalents thereof.

What is claimed is:

1. An optical fiber display apparatus comprising:
    (a) a housing;
    (b) a holding member functionally connected to the housing, and capable of induced movement about a pivot point axis;
    (c) at least one fiber optic strand having a first end rigidly attached to the holding member and a second end extending beyond the holding member, the holding member and the at least one fiber optic strand defining a longitudinal axis that is substantially parallel to the first end of the at least one fiber optic strand, wherein the longitudinal axis defined by the holding member and the at least one fiber optic strand is relatively perpendicular to the pivot point axis of the holding member, and wherein the second end of the fiber optic strand is unrestrained and free to move about randomly as the holding member moves about the pivot point axis; and
    (d) a light source illuminating the first end of the fiber optic strand, whereby light emits from the second end of the fiber strand.

2. The apparatus according to claim 1, wherein the at least one fiber optic strand comprises a plurality of fiber optic strands affixed to the holding member.

3. The apparatus according to claim 1, wherein the longitudinal axis of the holding member extends through the holding member and is substantially parallel to the at least one fiber optic strand at a point of attachment of the fiber optic strand to the holding member, and is substantially relatively perpendicular to the pivot point axis of the holding member.

4. The apparatus according to claim 1, further comprising a second housing and a base plate, the base plate attached to the holding member and functionally connected to the second housing, wherein the base plate and holding member are moveable about an axis extending through the base plate and the second housing.

5. The apparatus according to claim 4, wherein the holding member is oriented so that the pivot point axis of the holding member is substantially relatively perpendicular to the axis extending through the base plate and the second housing.

6. The apparatus according to claim 4, further comprising drive means for moving the base plate about the axis extending through the base plate and the second housing, wherein said drive means is functionally attached to the second housing and comprises one or more selected from the group consisting of a rotatable cam wheel, gear, sprocket, pulley, hand crank, and electric motor.

7. The apparatus according to claim 4, further comprising drive means for moving the base plate about the axis extending through the base plate and second housing, wherein the drive means comprises a first magnetic member attached to the base plate and magnetically coupled to a second magnetic member attached to the second housing, the first and second magnetic members selected from the group consisting of permanent magnets and electromagnetic coils of wire.

8. The apparatus according to claim 7, wherein at least one of the first and second magnetic members comprises an electromagnetic coil of wire, and further wherein magnetic coupling between the first and second magnetic members is created by an electric current signal applied to the electromagnetic coil, creating a magnetic field about the electromagnetic coils and magnetic attraction and repulsion forces between the first and second magnetic members, whereby the base plate, the holding member and the at least one fiber optic strand move about the axis extending through the base plate and the second housing, said movement directly proportional to polarity, frequency and strength of the electric current input signal.

9. The apparatus according to claim 1, wherein the light source is affixed to the holding member, said light source being oriented to continuously illuminate the first end of the at least one fiber optic strand, whereby continuous light emits from the second end of the at least one fiber optic strand as the holding member travels about its pivot point axis.

10. The apparatus according to claim 1, further comprising a rotational drive means and a cam wheel axially and rigidly mounted to the drive means, the drive means and the cam wheel functionally attached to the housing, the cam wheel functionally connected to the holding member, the rotational drive means and the cam wheel oriented whereby rotation of the drive means and cam wheel induces an oscillation movement of the holding member and the at least one fiber optic strand about the pivot point axis.

11. The apparatus according to claim 10, wherein the rotational drive means comprises at least one selected from the group consisting of an electric motor, gear, pulley, flywheel, and hand crank.

12. The apparatus according to claim 10, further comprising a connecting rod having a first end and a second end, the first end functionally attached to the cam wheel and the second end functionally attached to the holding member, whereby rotation of the cam wheel and the first end of the coupling rod induces an oscillation movement in the second end of the coupling rod and the holding member directly proportional to the rotational speed of the cam wheel.

13. The apparatus according to claim 10, wherein the cam wheel includes a cylindrical surface axially and rigidly attached to the drive means, said cylindrical surface parallel to and of unequal distance to a rotational axis, at least a portion of said cylindrical surface coming in direct contact with the holding member, whereby rotation of the cam wheel induces a back and forth oscillation of the holding member about the pivot point axis in direct proportion to the rotational speed of the drive means and cam wheel.

14. The apparatus according to claim 13, wherein the holding member includes a channel or groove, said channel or groove containing an inward-facing surface surrounding the cam wheel, said inward-facing surface being suitable for direct contact with at least a portion of the cylindrical surface of the cam wheel, whereby rotation of the cam wheel within the channel or groove and coming in direct contact with the inward-facing surface of the channel or groove causes the holding member to oscillate about the pivot point axis in direct proportion to the rotational speed of the drive means and cam wheel.

15. An optical fiber display apparatus comprising:
   (a) a housing;
   (b) a holding member moveable about a pivot point axis functionally connected to the housing;
   (c) at least one fiber optic strand having a first end attached to the holding member and a second end unrestrained, the holding member and the at least one fiber optic strand defining a longitudinal axis extending through the center of the holding member and relatively parallel to the at least one fiber optic strand at a point of attachment of the strand to the holding member, wherein the pivot point axis of the holding member is relatively perpendicular to the longitudinal axis of the holding member and the at least one fiber optic strand, whereby movement of the holding member about its pivot point axis causes the second unrestrained end of the at least one fiber optic strand to reciprocate back and forth through space;
   (d) a light source functionally connected to the housing or holding member and illuminating the first end of the at least one fiber optic strand, whereby light emits from the second end of the at least one fiber optic strand; and
   (e) means for moving the holding member about its pivot point axis comprised of a first magnetic member attached to the holding member and a corresponding second magnetic member attached to the housing, wherein the first and second magnetic members comprise at least one electromagnetic coil of wire and at least one permanent magnet, and further wherein an electric current signal conducting through the electromagnetic coil of wire causes movement of the holding member and the at least one fiber optic strand about the pivot point axis of the holding member, in direct proportion to polarity, strength and frequency of the electric current signal, and wherein the electric current signal source is selected from the group consisting of an amplifier, radio, signal generator, microphone, speaker output, AC line voltage, AC power supply, DC power supply.

16. The apparatus according to claim 15, wherein the light source comprises one or more selected from the group consisting of an incandescent bulb, light emitting diode, laser diode, mirror, prism, lens, and an array of incandescent bulbs.

17. The apparatus according to claim 15, wherein the light source is affixed to the holding member and oriented to continuously illuminate the first end of the at least one fiber optic strand, whereby continuous light emits from the second end of the at least one fiber optic strand as the holding member travels about the pivot point axis.

18. The apparatus according to claim 15, further comprising:
(a) a second housing functionally connected to the first housing about a pivotal or rotational axis, wherein the pivotal or rotational axis is non-parallel to the pivot point axis of the functional connection between the first housing and the holding member, wherein the first housing is capable of induced movement about said pivotal or rotational axis within the second housing; and
(b) a drive means for inducing movement of the first housing relative to the second housing, the drive means comprising an electric motor affixed to the second housing, said motor being mechanically coupled to the first housing, whereby rotation of the motor creates movement of the first housing relative to the second housing.

19. The apparatus according to claim 15, further comprising:
(a) a second housing functionally connected to the first housing about a pivotal or rotational axis, wherein the pivotal or rotational axis is non-parallel to the pivot point axis of the functional connection between the first housing and the holding member, wherein the first housing is capable of induced movement about said pivotal or rotational axis within the second housing;
(b) a drive means for inducing movement of the first housing relative to the second housing, the drive means comprising a first magnetic member attached to the first housing and magnetically coupled to a corresponding second magnetic member attached to the second housing, wherein the first magnetic member and the second magnetic member comprise at least one permanent magnet and at least one electromagnetic coil of wire; and
(c) wherein the first magnetic member is magnetically coupled to the second magnetic member by an electric current signal applied to the electromagnetic coil, whereby a magnetic field is created about the electromagnetic coil and magnetic attraction and repulsion forces between the first and second magnetic members induces movement of the first housing within the second housing, said movement directly proportional to polarity, frequency and strength of the electric current input signal.

20. An optical fiber display apparatus comprising:
(a) a first housing;
(b) a holding member moveable about a pivot point axis functionally connected to the first housing;
(c) at least one fiber optic strand having a first end attached to the holding member and a second end unrestrained, the holding member and the at least one fiber optic strand defining a longitudinal axis extending through the center of the holding member and relatively parallel to the fiber optic strand at a point of attachment of the fiber strand to the holding member, wherein the pivot point axis of the holding member is relatively perpendicular to the longitudinal axis of the holding member and the at least one fiber optic strand, whereby movement of the holding member about its pivot point axis causes the second unrestrained end of the at least one fiber optic strand to reciprocate back and forth through space;
(d) a light source functionally connected to the first housing or the holding member and illuminating the first end of the at least one fiber optic strand, whereby light emits from the second end of the at least one fiber optic strand;
(e) means for moving the holding member about its pivot point axis comprised of a first magnetic member attached to the holding member and a corresponding second magnetic member attached to the first housing, wherein the first and second magnetic members comprise at least one electromagnetic coil of wire and at least one permanent magnet, and further wherein an electric current signal conducting through the electromagnetic coil of wire causes movement of the holding member and the at least one fiber optic strand about the pivot point axis of the holding member, in direct proportion to polarity, strength and frequency of the electric current signal, and wherein the electric current signal source is selected from the group consisting of an amplifier, radio, signal generator, microphone, speaker output, AC line voltage, AC power supply, DC power supply;
(f) a second housing containing a base plate, the base plate attached to the first housing and moveable about an axis extending through the second housing and the base plate that is non-parallel to the longitudinal axis of the holding member and the at least one fiber optic strand and relatively perpendicular to the pivot point axis of the holding member; and
(g) drive means for moving the base plate about the axis extending through the second housing and the base plate, wherein the drive means is functionally attached to the second housing and comprises one or more selected from the group consisting of an actuator rod, cam wheel, gear, sprocket, pulley, electric motor, magnetic coupling, whereby movement of the base plate and the first housing create a second, simultaneous movement of the holding member, the light source and the at least one fiber optic strand about the axis extending through the second housing and the base plate and across the pivot point axis of the holding member.

* * * * *